United States Patent [19]

Welker

[11] 4,177,676

[45] Dec. 11, 1979

[54] SENSOR POSITIONING APPARATUS

[76] Inventor: Robert H. Welker, P.O. Box 1228, Bellaire, Tex. 77401

[21] Appl. No.: 909,452

[22] Filed: May 25, 1978

[51] Int. Cl.² ............................................. G01F 15/18
[52] U.S. Cl. .................................. 73/198; 73/231 R; 73/432 R
[58] Field of Search ................... 73/86, 198, 229, 231, 73/343 R, 422, 432 R

[56] References Cited

U.S. PATENT DOCUMENTS

| | | | |
|---|---|---|---|
| 2,783,644 | 3/1957 | Willis | 73/86 |
| 2,870,629 | 1/1959 | Willis | 73/86 |
| 3,007,340 | 11/1961 | Kraftson | 73/86 X |
| 3,691,846 | 9/1972 | Ingold | 73/86 |
| 3,718,034 | 2/1973 | Swearingen | 73/86 |
| 3,747,411 | 7/1973 | McDermott et al. | 73/422 |
| 4,064,756 | 12/1977 | MacLean | 73/272 |
| 4,096,754 | 6/1978 | Beveridge, Jr. et al. | 73/432 |

*Primary Examiner*—Herbert Goldstein
*Attorney, Agent, or Firm*—Gunn & Lee

[57] ABSTRACT

A meter mounting mechanism which is hydraulically operated is disclosed. It is particularly adapted to insert and position a meter transducer in a high pressure environment. The illustrated embodiment discloses a flange-mounted mechanism for positioning a sensor in a pipeline against extremely high pressures. The apparatus utilizes a flange-mounted, correctly oriented, bottom plate which secures an elongate cylinder. The cylinder encloses a piston on a piston rod. The piston rod extends above and below the cylinder. The piston rod is hollow to permit transducer connections can extend through it. The piston rod carries a transducer at the lower end. The transducer is able to be retracted on the rod into a shield to protect it. The piston rod extends upwardly through the head of the cylinder and on the exterior and further is equipped with a mechanism for locking the rod against rotation so that the rod does not rotate to thereby continue azimuthal orientation of the rod, piston and transducer mounted at the lower end.

7 Claims, 3 Drawing Figures

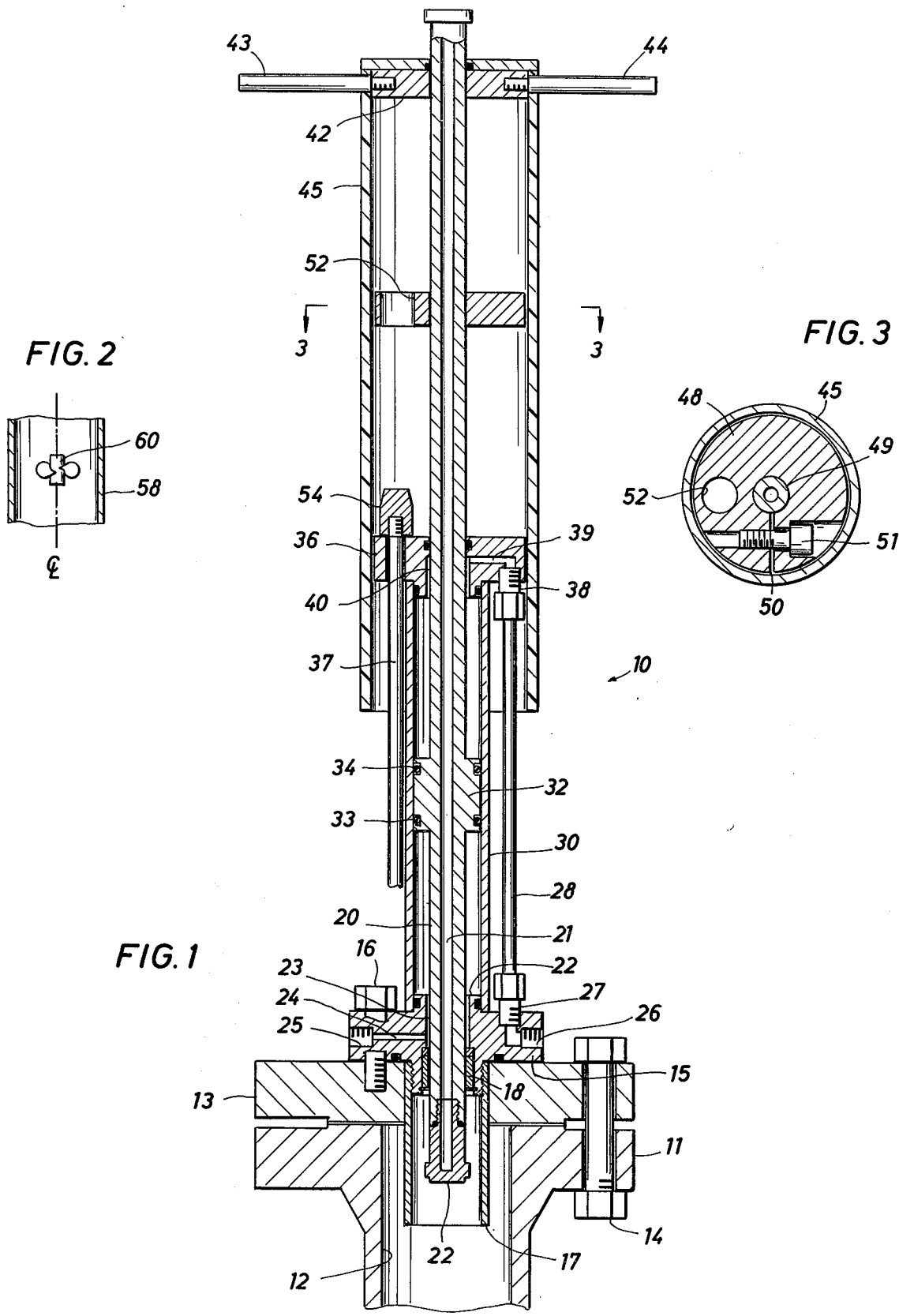

SENSOR POSITIONING APPARATUS

BACKGROUND OF THE DISCLOSURE

In many pipelines flowing gaseous or liquid products, it is necessary to measure the flow through the line. The measuring device must extend into the line in some form or fashion. Several types of measurements may be necessary. One measurement is the flow volume as determined by a turbine flow meter. A turbine flow meter includes laterally extending blades or vanes which are spun by the passing fluid or gas. Turbine flow meters are well known in the art. They are difficult to mount, however, and it is for this purpose that the present invention has been devised.

Another type of equipment which is sometimes required in a pipeline is a pressure sensor. The total value of the product flowing past the sensor is, in part, dependent on the temperature of the flowing material. Some pipelines thus require a thermometer.

Another apparatus which requires insertion into a high pressure pipeline is a sampler apparatus. In liquid products, there is a tendency to stratify based on the weight of the molecule. Accordingly, heavier molecules settle to the bottom of the pipeline, and lighter molecules are found at the top. If a sample is removed from the very topmost part of the pipeline, it will tend towards the lighter end of hydrocarbon products. Conversely, a sampler positioned with its inlet at the very bottom of the pipe would distort the data by yielding a sample with large or heavy molecules. This problem can be alleviated somewhat by creating turbulence upstream of the sample device, but this is not a wholly desirable approach.

When an item projects into the center of the pipe, it runs the risk of being damaged by pipeline pigs which flow through the pipe. A pipeline pig is often inserted into a pipe to clean or clear the pipe. Cleaning occurs by the scrubbing action of the pig rubbing against the wall of the pipe. Most pipelines are cleaned with pigs sized to fill the cross-sectional area of the pipe. Moreover, full-sized pigs are normally required so that the pig is pushed through the pipe by the flowing product in the pipeline.

If a meter device extends into a pipe at the center, there is a risk that the pig will break off the metering device.

Heretofore, there have been devices provided which would position probes at the center parts of a pipeline. They have encountered difficulties in mounting. As an example, where they are threaded devices, they are difficult to retract for pig passage, requiring a motorized or manually operated mechanism rotating the probe for retraction. This is difficult to achieve in a minimum amount of time, and there is a further problem of starting the threads together so that cross threading and/or galling is avoided. Even when cross threading is avoided, there is some uncertainty as to the azimuthal orientation of the device presuming that the apparatus includes a transducer which must be axial with the pipe. An axial position is extremely important in flow meters, as an example.

The present apparatus is an improvement over equipment known heretofore, and, in particular, it includes and utilizes a mechanism which quickly retracts a probe assembly. It is adapted for support of practically any kind of sensor. It will be described in conjunction with a turbine sensor well known in the art. The turbine sensor is a type of device which must be parallel with the axis of the pipe. More importantly, the present apparatus is able to function repetitively with predictable repositioning both in terms of depth of penetration into the pipe and azimuthal orientation.

BRIEF DESCRIPTION OF THE DISCLOSED APPARATUS

This apparatus is a flange-mounted structure adapted to be fitted at a tee in a pipe. It is a pneumatic or hydraulically operated probe mechanism utilizing a laterally extending cylinder, the cylinder receiving a piston which is hydraulically forced through the cylinder, and the piston connects to a double-ended piston rod. One end of the piston rod extends towards the center of the pipe, passing through a flange and is adapted to support a sensor. The piston rod is hollow to enable an outlet lead from the sensor to be positioned in it and extend to the upper end. The piston rod is located on the exterior of the cylinder adjacent to a handle, permitting hand operation. The piston rod carries a lock ring for alignment so that the rod enables connection to external equipment for the sensor. The apparatus further includes means serving as an inlet for hydraulic fluid to drive the piston, the apparatus including a double-acting hydraulic system.

BRIEF DESCRIPTION OF THE DRAWINGS

FIG. 1 is a sectional view through the hydraulically operated probe insertion apparatus of the present invention showing the apparatus mounted above a flange of a tee;

FIG. 2 is a sectional view through a pipe disclosing axial alignment of a sensor carried on the probe with the pipe; and FIG. 3 is a top view of an alignment washer which prevents rotation of the probe and apparatus.

DETAILED DESCRIPTION OF THE ILLUSTRATED EMBODIMENT

Attention is first directed to FIG. 1 of the drawings which illustrates the present apparatus. The hydraulically operated probe insertion apparatus is identified by the numeral 10. It will be described proceeding from the bottom of the apparatus to the top as shown in FIG. 1. It is supported on a flange 11. The flange 11 is typically the lateral flange of a tee tied to a pipeline. The tee does not have to be square; that is to say, the pipeline may be any practical size, while the lateral need only be a few inches in diameter. The axial bore 12 can have a passage of about three or four inches in diameter. The flange 11 is constructed in accordance with industry standards for mounting the present apparatus. The lateral passage 12 is perpendicular to the centerline of the pipeline where the probe is to be positioned.

The present apparatus is permanently installed with a matching flange 13. The flange 13 is affixed to the flange 11 by suitable nuts and bolts indicated at 14. The flange 13 is fairly large and heavy. Because of this, it is preferably left permanently in place. A smaller flange 15 is positioned on the top of the flange 13. The flange 15 is quite small in comparison and is, therefore, readily removed by a single operator. The flange 15 is affixed to the flange 13 by suitable bolts 16 shown in the drawings. Needless to say, the bolts 14 and 16 are used in sets which are arranged in a bolt circle around the apparatus. The bolt circles are constructed and arranged in accordance with industry standards.

The flange plate 15 is threaded to a shroud 17 of circular construction. It is a hollow, tubular member. The shroud 17 not only threads to the flange, but, in addition, it includes an external, overhanging shoulder. There is a mating and matching counterbored opening through the flange plate 13 which locks the shoulder in position. Thus, the flange plate 13 secures the shroud in position, and, moreover, it cannot drop through into the pipe. The shroud 17 is concentric with and internally positioned in the lateral passage 12. It serves as a protective receptacle for a presumably delicate sensor affixed to the lower end of the equipment, as will be described.

The numeral 18 identifies a seal located on the inner axial passage of the flange plate 15. The seal 18 is a sleeve around a piston rod 20. The piston rod 20 is axially hollow with a passage 21. The piston rod extends to a lower end and has a cap 22 over it. The cap 22 is a hollow, thimble-shaped cap which threads to the lower end of the piston rod, and it may be removed at any time to enable a sensor to be connected to the lower end of the apparatus. The present invention does not include a sensor, but a sensor is mounted on the lower end of the apparatus. Mounting a sensor customarily utilizes the threads exposed when the cap 22 is removed. One sensor is manufactured by the Electronic Flow-Meters, Inc. firm of Dallas, Texas, and is a flow meter having a turbine mounted on a spindle. It requires connection with suitable data handling equipment on the exterior such as an amplifier and pulse counter. The turbine flow meter, cable, amplifier and pulse counting apparatus do not comprise a part of the present invention, but they are supporting apparatus to exemplify the use of the present invention. Alternately, a metering orifice can be installed at the tip of the probe for delivering a sample or specimen through the stem or piston rod 20. Another form of equipment is a temperature probe which is installed at the lower end of the piston rod. The passage 21 is plugged or blocked by a suitable packing around the conduits or conductors extending upward through the passage 21. The only exception to this when the device is used as a sample apparatus when a flow is tapped from the pipeline and delivered through the passage 21 to a point remote from the pipeline.

The present invention utilizes an upstanding, central lip 22 centered around an axial passage 23. The passage 23 receives the piston rod 20 through it and fits loosely about it to enable telescoping movement. Further, a lateral passage 24 is drilled through the flange from the side and terminates at a tapped opening 25. The opening 25 is threaded and adapted to connect with an hydraulic line. The hydraulic line delivers hydraulic fluid under pressure through the tapped opening 25, the lateral passage 24 and on the exterior of the piston rod 20. Hydraulic fluid is used to operate the equipment, as will be understood.

The flange plate 15 incorporates a second tapped opening at 26. It is suitably constructed for receiving a hydraulic line which delivers hydraulic fluid under pressure. The tapped opening 26 opens into another fitting 27 which, in turn, connects with a hydraulic line 28. A double-acting piston arrangement is used in the present invention. However, as a convenience to installation, both the tapped openings 25 and 26 are located at a common flange location to enable fairly easy connection. However, the hydraulic fluid from one is introduced beneath the piston, and the hydraulic fluid delivered through the other fitting is delivered to the top of the piston.

The numeral 30 identifies a cylinder. The cylinder 30 fits over the upstanding lip 22 on the flange 15. The cylinder 30 stands fairly tall to define a chamber sufficiently large to receive a piston 32. The piston 32 is integrally constructed with or joined to the piston rod 20. The piston rod is longer than the cylinder for reasons to be explained. The piston 32 fits snugly on the inside of the cylinder 30, and suitable seals are located at 33 and 34 to seal the upper and lower chambers within the cylinder. The cylinder 30 terminates at a cylinder head 36. The head 36 caps the top of the cylinder and is parallel to the flange plate 15. This defines the two chambers in the cylinder.

The cylinder head 36 is held parallel to the plate 15. This is achieved by the use of long rods 37 which are threaded at each end. Several are arranged around the cylinder. The precise number is subject to variation, but, typically, six or eight will suffice. The rods 37 are pulled taut by threading nuts to the upper end after threaded connection with the flange plate 15 at the lower end.

The cylinder head 36 is connected by a suitable hydraulic fitting 38 to the conduit 28. This, in turn, communicates hydraulic fluid through a passage 39 to the center of the cylinder head. It will be observed that the passage 39 opens into a counterbored axial passage 40, the axial passage 40 being larger than the piston rod 20, thereby permitting hydraulic fluid to flow downwardly to the hydraulic cylinder 32. This is the route of flow of hydraulic fluid acting above the piston 32.

The cylinder head is axially hollow to permit the piston rod 20 to extend above it. The piston rod 20 is fairly long. The length depends on scale factors. As an example, if it is necessary to extend the probe by twenty inches, the piston, itself, must be permitted to make a twenty-inch stroke from the bottommost position to the topmost position. Ideally, the piston is arranged relative to the lower tip of the sensor so that it is positioned at the requisite location, as, for example, in the center of the pipe. Thus, if a twenty-inch stroke is required for the apparatus, the piston rod in the extended position will be at least an inch or so taller than the cylinder head 36 and, after the upstroke, will extend an additional twenty inches or more thereabove. To this end, the piston rod is fairly long and extends upwardly to a bracket 42. The bracket 42 is equipped with parallel handles 43 and 44 to enable it to be hand gripped and pulled upwardly. The bracket 42 is affixed to the piston rod at the upper end. The bracket 42 preferably has a circular outer profile and supports a telescoping sleeve 45. The sleeve 45 is transparent plastic to permit an observer to see the relative rotational position of the parts, as will be described. It is not essential to operation, but it is a convenience. Moreover, if the equipment is installed in inclement weather, the sleeve keeps rain off the piston rod. Preferably, the bracket 42 is sealed to the piston rod at the upper end so that all the remaining portions of the piston rod are not exposed directly to rain. The tubular sleeve 45 fits loosely around the cylinder head 36.

The piston supports a guide washer 48 shown in FIG. 3. The washer 48 is axially drilled at the center with a passage 49 to fit around the piston rod. It is preferably made of a material which has some yield in it. It is placed on the rod by passing the rod through the opening 49. The disk is split at a lateral cut 50 to enable it to shrink. It is shrunk by utilizing a threaded bolt 51 which is received in a suitable socket on the right and which threads into a tapped opening on the left of the split 50. Through the use of an Allen wrench or other drive mechanism, the bolt 51 is threaded to thereby tighten the grip of the disk 48 around the piston. This achieves alignment and locks it in position even though it is carried on the piston in upward and downward movement.

It will be observed in FIG. 3 of the drawings that the disk 48 has a second opening at 52. This is an alignment or guide opening. The alignment or guide opening 52 is sized to fit about a crown nut 54. It will be recalled that several long rods 37 extend between the bottom flange plate 15 and the cylinder head 36. Several of the rods are equipped with conventional nuts at the top, but one of the rods is provided with a crown nut. This is a fairly tall nut as shown in the drawings, and it includes a tapered upper portion. The tapered upper portions serves as an alignment or guide when it passes through the opening 52. As the piston moves upwardly and downwardly, the hole 52 in the guide disk is positioned over the crown nut. The crown nut is optionally threaded at the top end to receive a nut on top of the disk 48 as a lock device.

The piston and piston rod are ideally oriented at a fixed azimuthal angle with respect to the apparatus. Many sensors must be angularly positioned. They must maintain a specific position. To this end, attention is directed to FIG. 2 of the drawings which is a sectional view along the centerline of the pipe. The pipe, itself, is identified by the numeral 58, and the sectional cut line passes through both sides of the pipe. A rotatable turbine 60 is shown, and it is axially positioned in coincidence with the centerline of the pipe, presuming this is the desired position. It is normally not desirable to position the turbine flow meter at an angle with respect to the centerline of the pipe. If it were at an angle, it would not read true data. Accordingly, to achieve the requisite positioning illustrated in FIG. 2, by way of example, it is necessary to utilize the alignment mechanism shown in FIG. 1, namely, the crown nut 54 which is positioned in the alignment disk 48. When the piston travels upwardly and then downwardly, alignment is fairly well assured on each trip. There is no force acting on the piston or piston rod which tends to rotate it. Notwithstanding this, there might be slight rotation on each full cycle of operation. Even if there is, the device always returns to the same angular position when the opening 52 is snugly centered around the crown nut 54.

The device is installed in the following manner. First of all, the flange plate 13 is fixed to the flange 11 of the tee. Thereafter, the shroud 17 is joined to the smaller flange plate 15, and the two of them together as a unit are seated on the flange plate 13. The bolts 14 and 16 are positioned at this time. It will particularly be observed that the flange plate 15 is removed by lifting, not by rotation. It is placed on the bolts 16 devoid of nuts. The piston rod is held by friction by the seal means 18 against rotation. This does not prevent it from rotating, but it makes rotation somewhat difficult. The sensor is affixed to the lower end of the piston rod 20. It is angularly positioned at the necessary angle. After it has been positioned, the sensor at the foot of the piston rod 20 is safely tucked away in the shroud with the piston 32 at the upward end of travel, and the entire removable assembly, including the shroud 17, the flange plate 15 and all the equipment thereabove, is seated on the larger flange plate 13. Then, the bolts 16 are threaded to suit-able nuts, and the equipment is made fast. The bolt 51 is loosened to thereby permit the alignment disk 48 to be rotated. It is rotated to position the hole 52 in it relative to the crown nut 54. Thereafter, the bolt 51 is tightened to lock the alignment disk in position. At this point, reciprocating travel of the piston remains true to the desired angle of orientation for the sensor. As mentioned before, many sensors require alignment with the centerline of the pipe as typified in FIG. 2.

In operation, hydraulic lines are connected to the tapped fittings 25 and 26. The probe is retracted by introducing fluid under pressure through the fitting 25 to flow beneath the piston 32 and force the piston upwardly as the hydraulic fliud is allowed to escape through port 26. Movement in the reverse direction is achieved by introducing hydraulic fluid under pressure through the tapped opening 26.

A sensor carried on the lower end of the apparatus must communicate with suitable interface equipment which conditions the signal and presents it in a usable manner. This is accomplished by placing the wiring or outlet line through the passage 21 to the upper end. The upper end of the piston rod is open, permitting the wiring to emerge therefrom and connect with other equipment. Ideally, this upper end is sealed by suitable means, including a gland or packing nut.

The present invention can be installed at any angular position around a pipeline. It is customarily installed in an upright position. When it is installed upright, the sleeve 45 on the exterior prevents the intrusion of rainwater. It can be installed at other angles, including laterally, at the cost of greater exposure to rain. However, sometimes a lateral installation may be the only available mode of installation. The apparatus can be self powered by obtaining its hydraulic force from the pressure within the pipeline acting on two hydraulic reservoirs. One is the "up" reservoir, and the other is the "down" reservoir.

The apparatus has been shown and described devoid of a hydraulic fluid pressure source, but it is believed that this is within the purview of one skilled in the art.

I claim:

1. An apparatus for mounting a sensor means for insertion into and removal from a pipeline against the pressure acting in the pipeline which apparatus is adapted to function at a tee on the pipeline and which comprises:
   (a) an elongate cylinder adapted to be positioned approximately perpendicular to the axis of a pipeline;
   (b) a piston slidably positioned in said cylinder;
   (c) means for mounting said cylinder to said tee in the pipe;
   (d) a piston rod connected to said piston and extending from said cylinder through the tee and into the pipeline on reciprocation by said piston;
   (e) wherein said piston rod is adapted to support a sensor means at one end thereof which end is inserted into and removed from the pipe by operation of said piston moving in said cylinder; and
   (f) wherein said mounting means includes
      (1) a first flange plate constructed in accordance with industry standards and adapted to be mated against a coacting flange on the tee connected to the pipeline and wherein said first flange plate is axially open to receive said piston rod therethrough;

(2) a base plate adapted to be joined and sealed against said first flange plate on the top side thereof and further adapted to sealingly support said cylinder;

(3) seal means extending around said piston rod to prevent leakage of fluid from the pipe; and (4) means for securing said base plate relative to said first flange plate.

2. The apparatus of claim 1 including a shroud supported by said mounting means and extending radially toward the centerline axis of the pipeline and which shroud is further adapted to receive the end of said piston rod therein and the sensor means supported thereby to shield the end of said piston rod.

3. The apparatus of claim 1 wherein said piston rod is axially hollow and provides a passage therethrough to enable a sensor means to be affixed to the lower end thereof and communicated along the axial passage whereby said sensor means forms an output provided through said hollow piston rod and, further, wherein said piston rod extends to the exterior of said cylinder to expose the hollow portion thereof to enable external connection through the hollow piston rod to the sensor means mounted thereon.

4. The apparatus of claim 1 including a cylinder head at the top end of said cylinder which, in conjunction with said base plate, seals said cylinder to divide said cylinder into a top chamber above the piston and a bottom chamber below the piston so that said piston is double acting on the application of fluid pressure in the top chamber or the bottom chamber.

5. The apparatus of claim 4 including an external sleeve encasing said cylinder head and supported on the piston rod which extends therefrom and further wherein said sleeve is telescoped about said cylinder for movement therewith.

6. The apparatus of claim 1 including means for aligning said piston rod at a fixed azimuthal orientation to prevent its rotation on reciprocating movement.

7. The apparatus of claim 6 wherein said alignment means includes a fixed protruding member and a means secured to said piston rod which are brought together in coacting fashion to limit rotation of said piston rod on insertion on axial movement of said piston and piston rod to reciprocate into and out of alignment.

* * * * *